(12) United States Patent
Vetterli

(10) Patent No.: US 10,856,691 B2
(45) Date of Patent: Dec. 8, 2020

(54) SUPPLY CONTAINER ARRANGEMENT FOR A BEVERAGE PREPARATION DEVICE

(71) Applicant: Franke Kaffeemaschinen AG, Aarburg (CH)

(72) Inventor: Heinz Vetterli, Wangen (CH)

(73) Assignee: Franke Kaffeemaschinen AG, Aarburg (CH)

( * ) Notice: Subject to any disclaimer, the term of this patent is extended or adjusted under 35 U.S.C. 154(b) by 516 days.

(21) Appl. No.: 15/638,745

(22) Filed: Jun. 30, 2017

(65) Prior Publication Data

US 2018/0028016 A1 Feb. 1, 2018

(30) Foreign Application Priority Data

Jul. 26, 2016 (DE) .................. 10 2016 213 642

(51) Int. Cl.
*A47J 31/44* (2006.01)
*A47J 31/42* (2006.01)
*A47J 42/50* (2006.01)
*A47J 31/00* (2006.01)
*A47J 31/40* (2006.01)
*B65D 83/06* (2006.01)
*B65D 71/50* (2006.01)
*A47J 31/06* (2006.01)

(52) U.S. Cl.
CPC ............. *A47J 31/44* (2013.01); *A47J 31/007* (2013.01); *A47J 31/405* (2013.01); *A47J 31/42* (2013.01); *A47J 42/50* (2013.01); *A47J 31/06* (2013.01); *B65D 71/502* (2013.01); *B65D 83/06* (2013.01)

(58) Field of Classification Search
CPC ........ A47J 31/44; A47J 31/007; A47J 31/405; A47J 31/06; B65D 51/1683; B65D 21/06; B65D 21/0215
See application file for complete search history.

(56) References Cited

U.S. PATENT DOCUMENTS

| 8,146,758 B1* | 4/2012 | Peres ................. B65D 81/3205 206/219 |
| 2007/0063079 A1* | 3/2007 | Ford ....................... A47J 31/42 241/30 |

FOREIGN PATENT DOCUMENTS

| EP | 2878240 | 6/2015 |
| WO | 2004098361 | 11/2004 |

* cited by examiner

*Primary Examiner* — Brian W Jennison
(74) *Attorney, Agent, or Firm* — Volpe Koenig

(57) ABSTRACT

In order to improve a beverage preparation device in terms of operability and ergonomics and in particular to simplify filling of a supply container with solid beverage starting products, a supply container arrangement is provided which has at least one two-part supply container having a lower part-container and a removable upper part-container which can be arranged on the lower part-container. The upper part-container has a bottom with a connection opening on which a closure device is arranged which is designed, when joining together the upper and lower part-containers, to open automatically and to free a connection between the upper and lower part-containers.

10 Claims, 6 Drawing Sheets

SUPPLY CONTAINER ARRANGEMENT FOR A BEVERAGE PREPARATION DEVICE

INCORPORATION BY REFERENCE

The following documents are incorporated herein by reference as if fully set forth: German Patent Application No. 102016213642.9, filed Jul. 26, 2016.

BACKGROUND

The present invention relates to a supply container arrangement for a beverage preparation device, for storing and feeding one or more solid starting products for the preparation of hot or cold beverages.

Beverage preparation devices which serve for the automatic preparation of hot or cold beverages are equipped with supply containers in which the starting products for the preparation are stored and fed to the preparation device as required. Here, the products are as a rule fed from such a supply container under the effect of gravitational force, that is to say the supply containers are arranged above or in an upper region of the respective preparation device. Particularly in the field of fully automatic coffee machines, bean containers are known which are arranged above the fully automatic coffee machine and, upon corresponding activation, the beans are guided automatically into a grinding unit situated below and from there into a brewing system. In addition, further supply containers for other added products, such as chocolate powder, for example, can be provided.

Since such beverage preparation devices are frequently comparatively large and are set up in their working height on a countertop or the like, it can be particularly difficult for operators of relatively small size to fill the supply containers arranged above the device.

SUMMARY

It is therefore an object of the present invention to provide a beverage preparation device which is improved in terms of operability and ergonomics and in particular to provide a supply container arrangement in which the operation of filling with solid starting products for the beverage preparation is simplified.

This and further objects are achieved by one or more features of the invention. Advantageous refinements can be found below and in the claims.

According to the invention, a supply container arrangement for a beverage preparation device has at least one two-part supply container having a lower part-container and a removable upper part-container which can be arranged on the lower part-container. The upper part-container has a bottom with a connection opening on which a closure device is arranged which is designed, when joining together the upper and lower part-containers, to open automatically and to free a connection between the upper and lower part-containers.

In this way, for filling purposes, the upper part-container can be removed, filled by the operator and arranged again on the lower part-container. Here, when joining together said part-containers, the connection opening is automatically opened, with the result that the starting products introduced can trickle from the upper part-container into the lower part-container. Since the supply container need not be removed as a whole from the beverage preparation device, but the lower part-container, together with the starting product contained therein, remains on the device, an operation of the device, or a beverage purchase, continues to be possible during the filling operation, that is to say with the upper part-container removed. The device thus also remains fully functional during this filling operation.

In a preferred embodiment, a rail guide is mounted above the lower part-container, into which rail guide the upper part-container is inserted to join together said part-containers. In this way, in the manner of a drawer, the upper part-container can be extracted in the horizontal direction, preferably forwards or rearwards with respect to the beverage preparation device, and inserted again after the filling operation. This results in simple and secure operability.

It is particularly advantageous here if the rail guide has an end stop for the upper part-container and can be mounted on the lower part-container in two mounting positions in such a way that the upper part-container can be inserted into the rail guide either from a first direction or from a second direction opposite to the first. The upper part-container can thus be inserted up to the end stop of the rail guide, with the result that its operating position on the lower part-container is clearly defined. Here, the different mounting positions of the rail guide make it possible for the operation of the beverage preparation device to be tailored to the location where it is set up. For example, to operate the beverage preparation device as a countertop device in the service area of a gastronomy business, the rail guide can be arranged such that the upper part-container can be extracted forwards. If, by contrast, the beverage preparation device is set up in a self-service area in front of a service area situated behind, the rail guide can be mounted such that the upper part-container can be extracted (only) rearwards, that is to say can be filled from the service area.

In a preferred embodiment, provision is made for the closure device to have a slide which closes the connection opening in a closing position and, when joining together the upper and lower part-containers, is pushed into its open position by a projection arranged on the lower part-container. Particularly in combination with a rail guide for the upper part-container, it is thus possible to achieve a simple and reliable automatic opening of the connection opening when joining together the upper and lower part-containers.

It is particularly advantageous here if a spring-loaded bar is provided which secures the slide in a closed state, and the bar has an oblique ramp against which the slide can be displaced while overcoming a spring force. It is possible to ensure with such a spring-loaded bar that, with the upper part-container removed, the slide does not inadvertently open and the starting products introduced are spilled.

In this embodiment, there is also provision that, when removing the upper part-container from the lower part-container, the slide is guided back into its closed position by a latching nose arranged on the lower part-container. Such a latching nose makes it possible that, when joining together the upper and lower part-containers, the slide can press the latching nose aside and slide past it; however, in the joined-together state, the latching nose comes to latch in behind the slide and guides it back into the closed position during the removal of the upper part-container. A situation is thus prevented in which any starting products still present in the upper part-container can fall out through the opened connection opening during the removal of the upper part-container.

In a supply container arrangement of the aforementioned type, it is additionally advantageous to design the bottom of the upper part-container as an oblique bottom which is inclined towards the connection opening, preferably to design the bottom such that it tapers in a funnel shape downwardly towards the connection opening. It is thereby ensured that starting products introduced into the upper part-container can be emptied completely into the lower part-container under the effect of gravitational force.

The present invention further relates to a beverage preparation device, in particular a fully automatic coffee machine, having a supply container arrangement of the aforementioned type.

In a preferred application of the present invention, the at least one two-part supply container of the supply container arrangement serves for receiving and feeding coffee beans for a fully automatic coffee machine. For this purpose, the two-part supply container for receiving the coffee beans is arranged above a grinding unit of the fully automatic coffee machine, with the result that the coffee beans fall from the supply container directly into the grinding unit.

BRIEF DESCRIPTION OF THE DRAWINGS

Further advantages and refinements of the present invention will emerge from the following description of an exemplary embodiment with reference to the figures, in which.

DETAILED DESCRIPTION OF THE PREFERRED EMBODIMENTS

Figure 1:
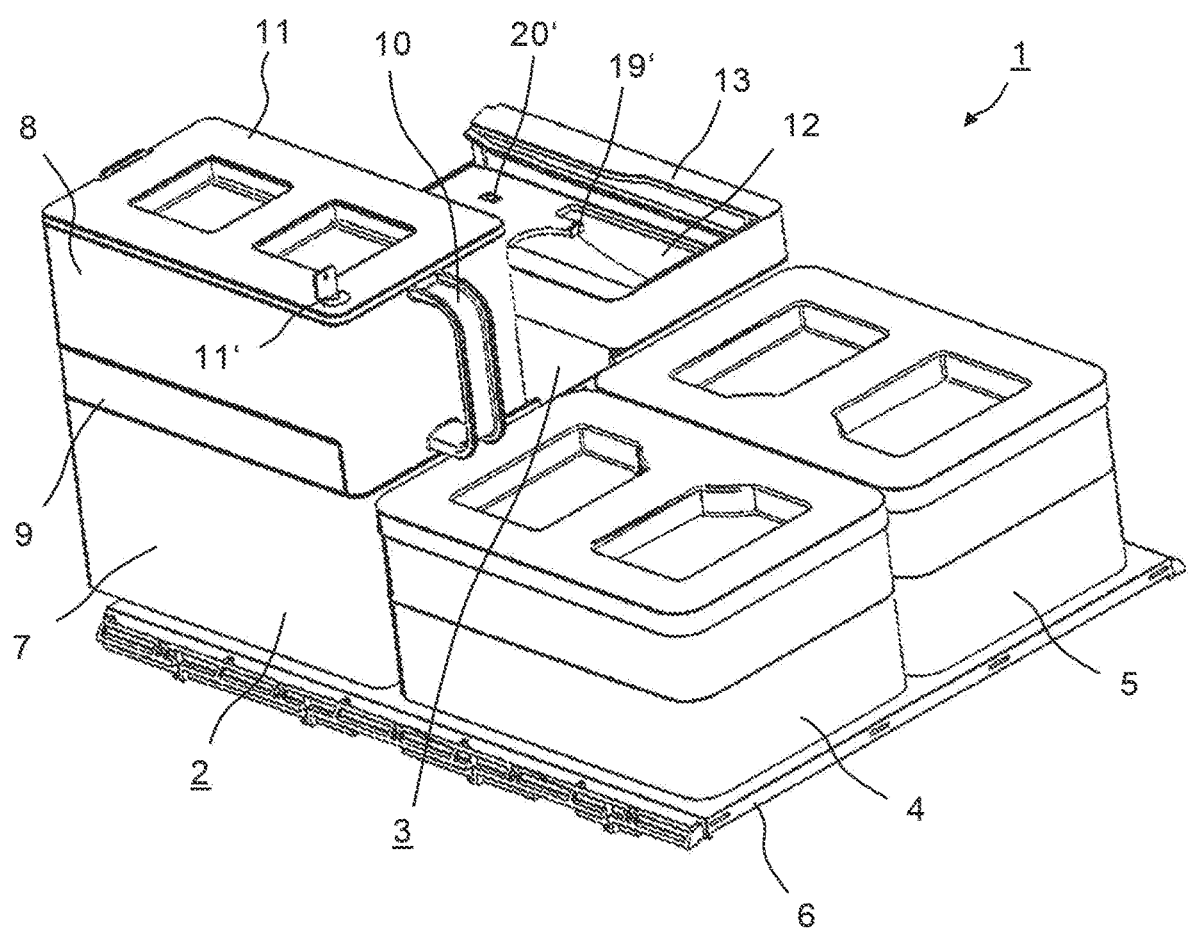
FIG. 1 shows an isometric illustration of a supply container arrangement for a fully automatic coffee machine.

FIG. 1 illustrates a supply container arrangement 1 for a fully automatic coffee machine. The supply container arrangement 1 comprises a total of four supply containers 2, 3, 4 and 5 which are arranged on a common plate 6 which serves as a cover plate of a fully automatic coffee machine. The two rear supply containers 2, 3 are each designed as two-part supply containers and serve to receive coffee beans. The two front supply containers 4, 5 are designed in one piece in a conventional manner and serve in the exemplary embodiment, without the invention being limited thereto, to receive chocolate powder.

Of particular interest in connection with the present invention are the two rear supply containers 2, 3, which are each of two-part design. The rear left-hand supply container 2 comprises a lower part-container 7 and an upper part-container 8 connected thereto via a rail guide 9. Here, the upper part-container 8 is inserted into the rail guide 9 from the front in the manner of a drawer or can be extracted forwards from the rail guide 9. For this purpose, it has a handle 10 by which the part-container 8 can be taken hold of and extracted forwards. In addition, the part-container 8 has a cover 11 which can be locked on the part-container 8 by a lock 11'. The cover 11 is additionally provided with an elastomer seal 11" (see FIGS. 4 and 5).

Of the rear right-hand supply container 3, all that is illustrated is its lower part-container 12 with the rail guide 13 arranged thereon. By contrast, the associated upper part-container has been removed. Unlike the left-hand supply container 2, the rail guide 13 of the right-hand supply container is here mounted, by way of example and merely for illustration, in the opposite mounting position, with the result that the associated upper part-container (not shown) can be inserted into the rail guide 13 from the rear or extracted rearwards therefrom.

Figure 2:
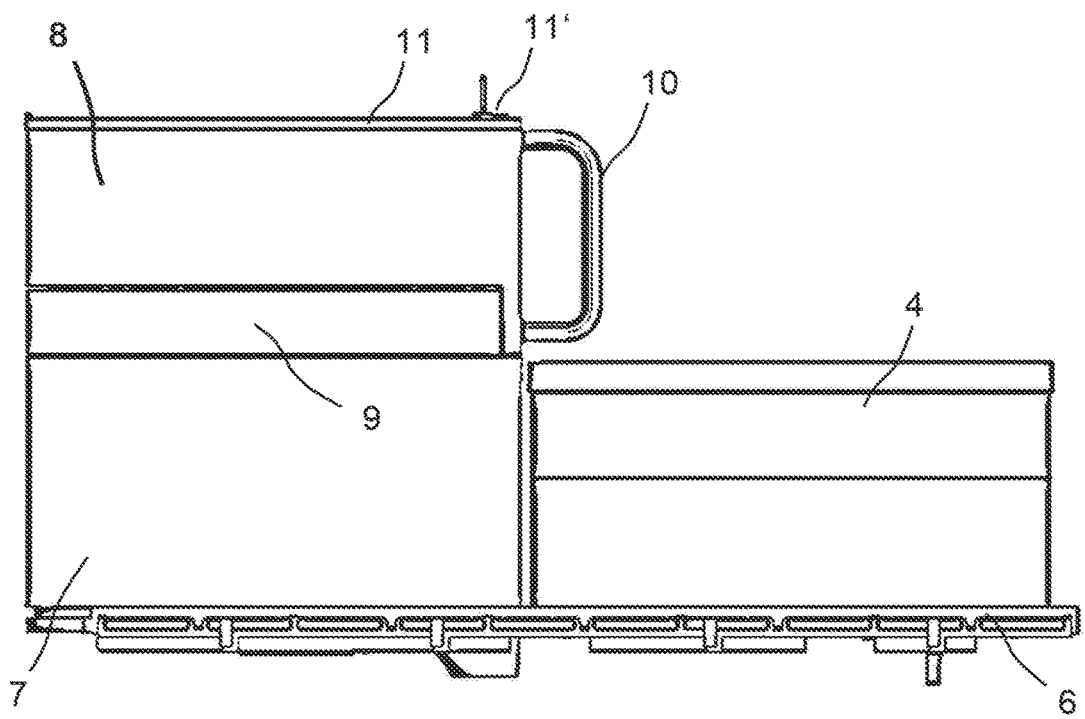
FIG. 2 shows a side view of the supply container arrangement from FIG. 1.
Figure 3:
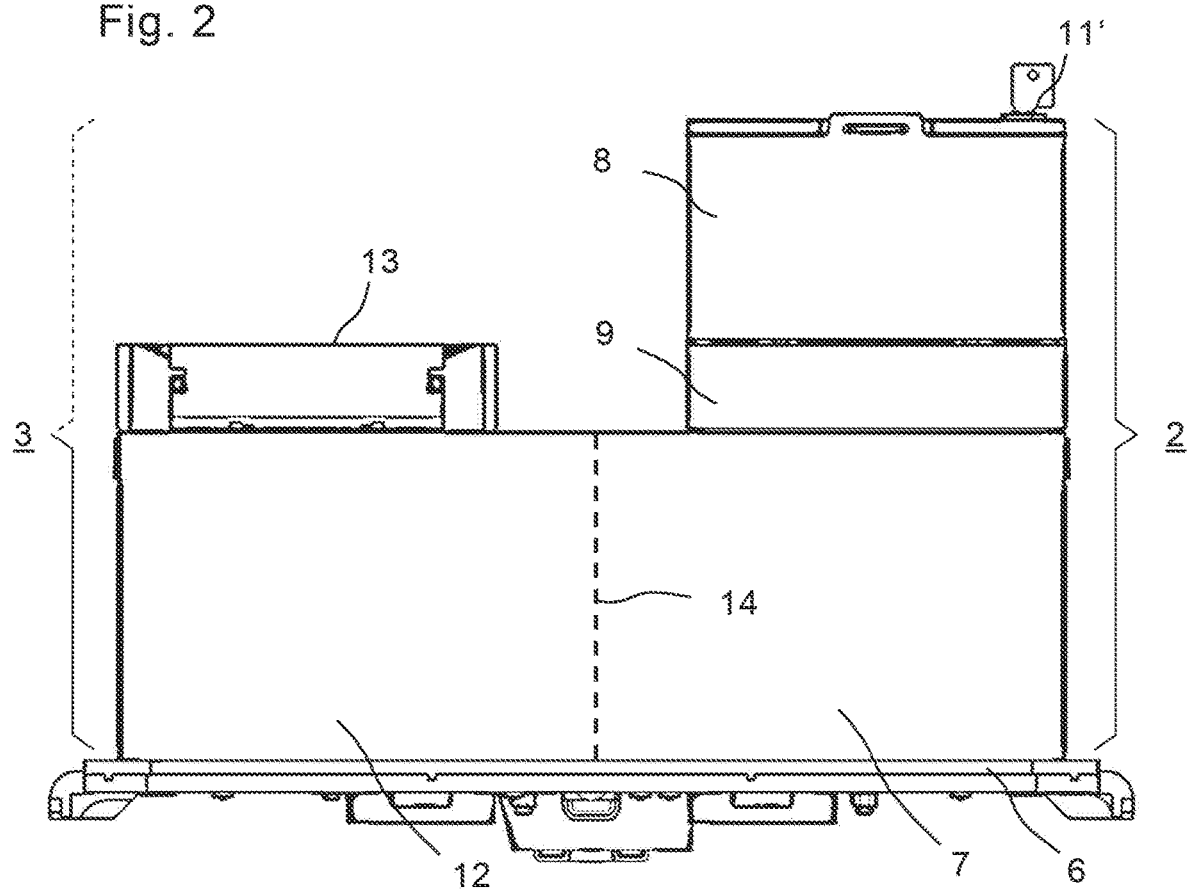
FIG. 3 shows a rear view of the supply container arrangement from FIG. 1.

FIGS. 2 and 3 show a side view and a rear view of the supply container arrangement. It can be seen in FIG. 2 that the upper part-container 8 can be extracted to the right by its handle 10 from the rail guide 9.

It becomes clear in FIG. 3 that the rail guide 9 for the supply container 2 is mounted in the opposite direction to the corresponding rail guide 13 of the second supply container 3.

Whereas the rail guide 9 on the right in FIG. 3 is mounted in such a way that the associated upper part-container 8 is extracted forwards, that is to say into the drawing plane, with respect to the fully automatic coffee machine, the corresponding rail guide 13 of the left-hand supply container 3 is mounted such that the associated upper supply container (not shown) is extracted rearwards, that is to say out of the drawing plane, with respect to the fully automatic coffee machine. The two lower part-containers 7, 12 are here configured as an integrated unit and separated internally from one another by a partition wall 14, which is illustrated by a dashed line.

Figure 4:
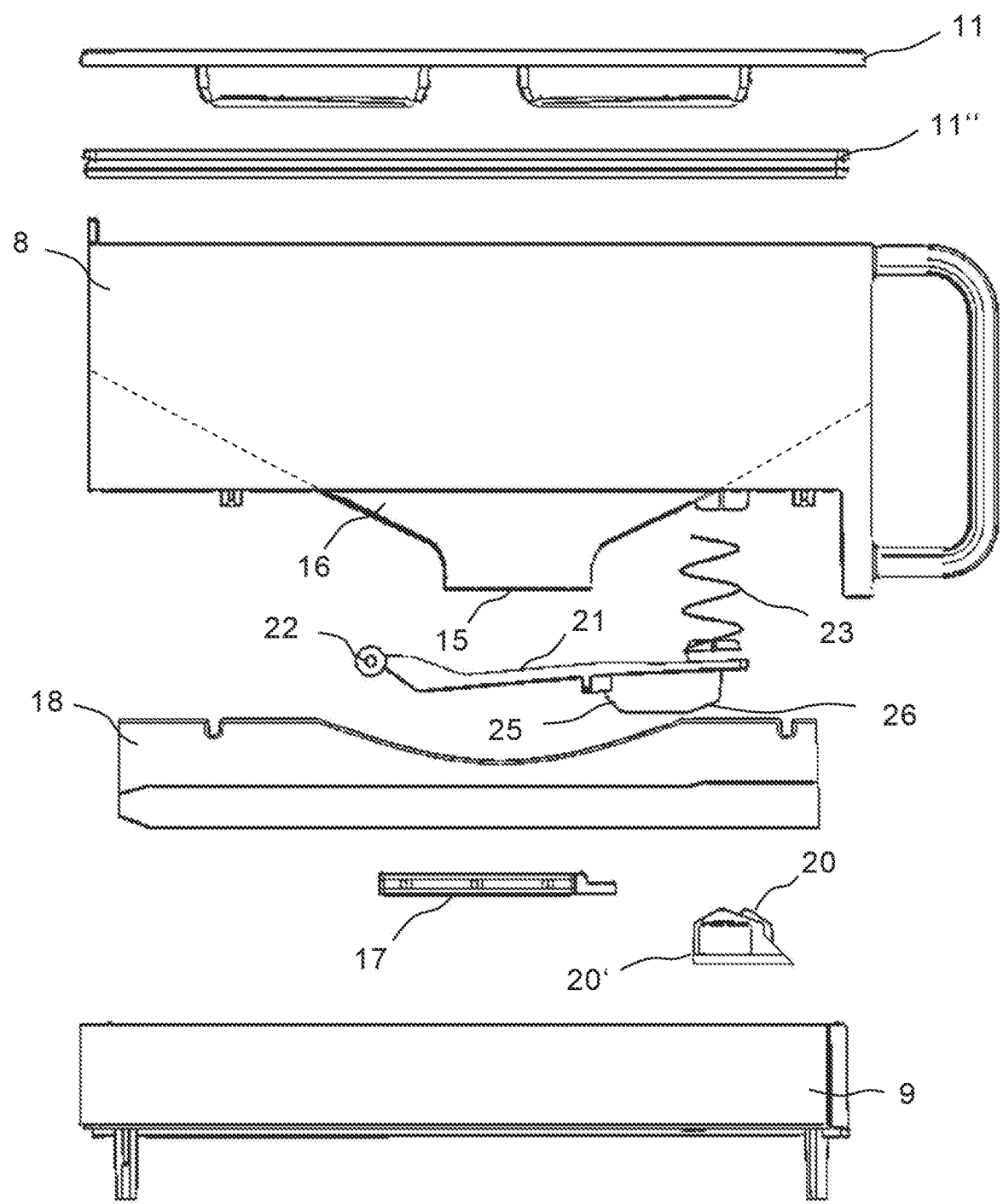
FIG. 4 shows a side view of the upper part-container in an exploded drawing.

The upper part-container 8 is illustrated in more detail in the exploded drawing in FIG. 4. It has an oblique bottom 16 which tapers downwards in a funnel shape towards a connection opening 15 and which forms a chute for coffee beans situated therein. A closure device is provided on the connection opening 15, said closure device automatically opening when inserting the upper part-container 8 into its associated rail guide 9, which is screwed to the lower part-container 7, or closing when extracting the upper part-container 8. The closure device comprises a slide 17 and a frame-shaped guide part 18 in which the slide 17 is displaceably guided in the longitudinal direction of the upper part-container 8. Two projections protruding laterally upwards in the interior of the rail guide 9 (cf. reference 19' in FIG. 1) ensure that the slide 17 is displaced into an opened position when inserting the upper part-container 8 into its rail guide 9, with the result that the connection opening 15 is freed. Additionally provided within the rail guide 9 are resilient latching noses 20 (cf. reference sign 20' in FIG. 1) which latch in behind the opened slide 17 and, when extracting the upper part-container 8, ensure that the slide 17 is moved back into its closing position in which it conceals the connection opening 15. In the exemplary embodiment, the latching noses 20 are arranged on a separate component 20' which is fastened resiliently or elastically below or on the rail guide 9.

Additionally provided is a locking mechanism which ensures that the slide 17 is secured in its closed position, with the result that, with the part-container 8 extracted, it cannot be inadvertently pushed open. For this purpose, a locking part 21 is provided which, in the manner of a rocker, is articulated on the frame-shaped guide part 18 by way of a hinge 22. A helical compression spring 23 ensures a downwardly directed prestressing force and, with the slide 17 closed, holds the locking part 21 in its locking position. The locking part 21 has a downwardly pointing latch 24 with oblique guide surfaces or ramps 25, 26. To open the slide 17, the locking part must be pressed upwards via the ramp 25 counter to the spring force of the helical spring 23, with the result that the slide 17 can be guided past the latch 24. In its open position, the latch 24 ensures, via the ramp 26, that the slide 17 can be guided back into its closed position only by overcoming the spring force of the spring 23.

Figure 5:
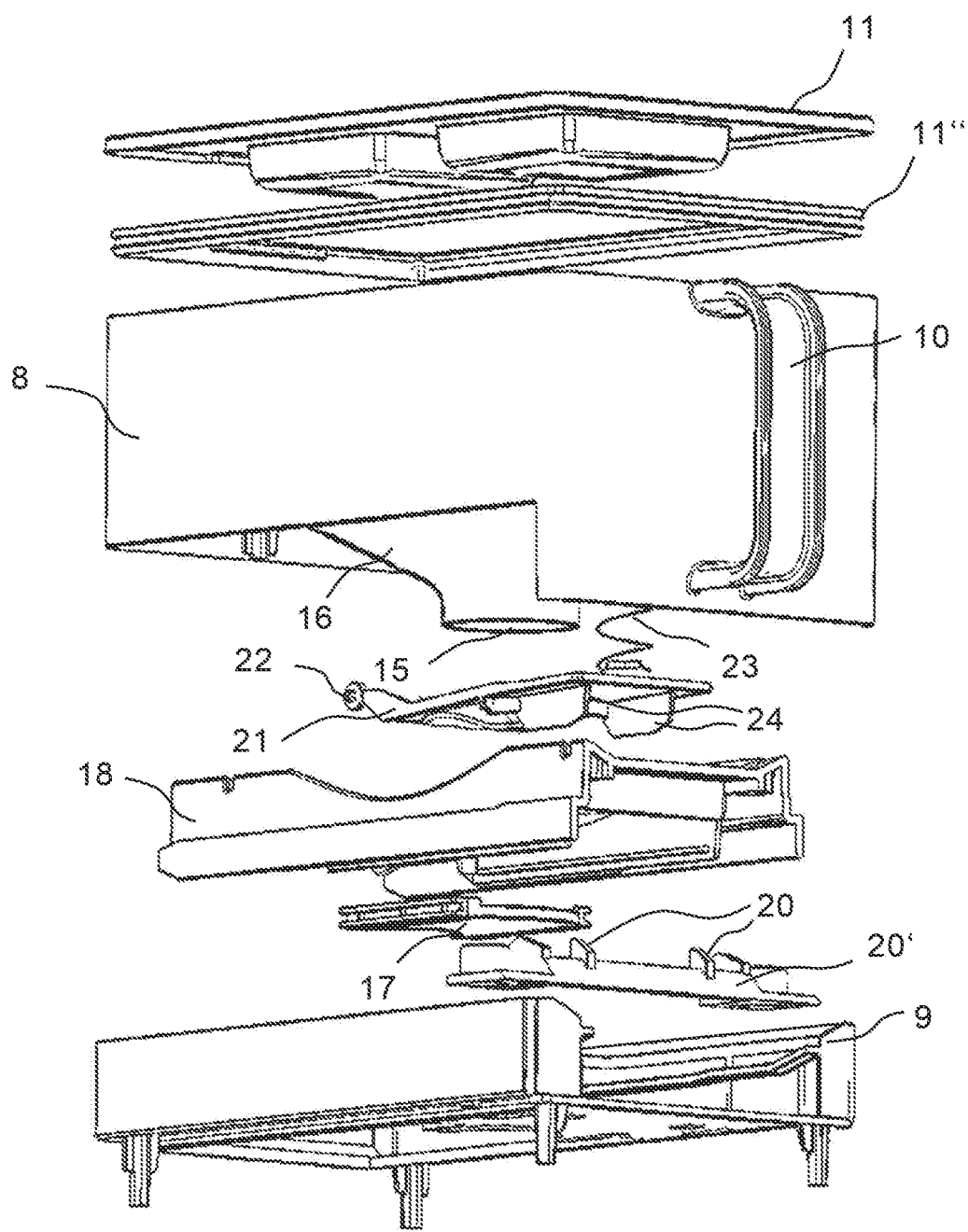
FIG. 5 shows an isometric illustration of the exploded drawing from FIG. 4.
Figure 6:
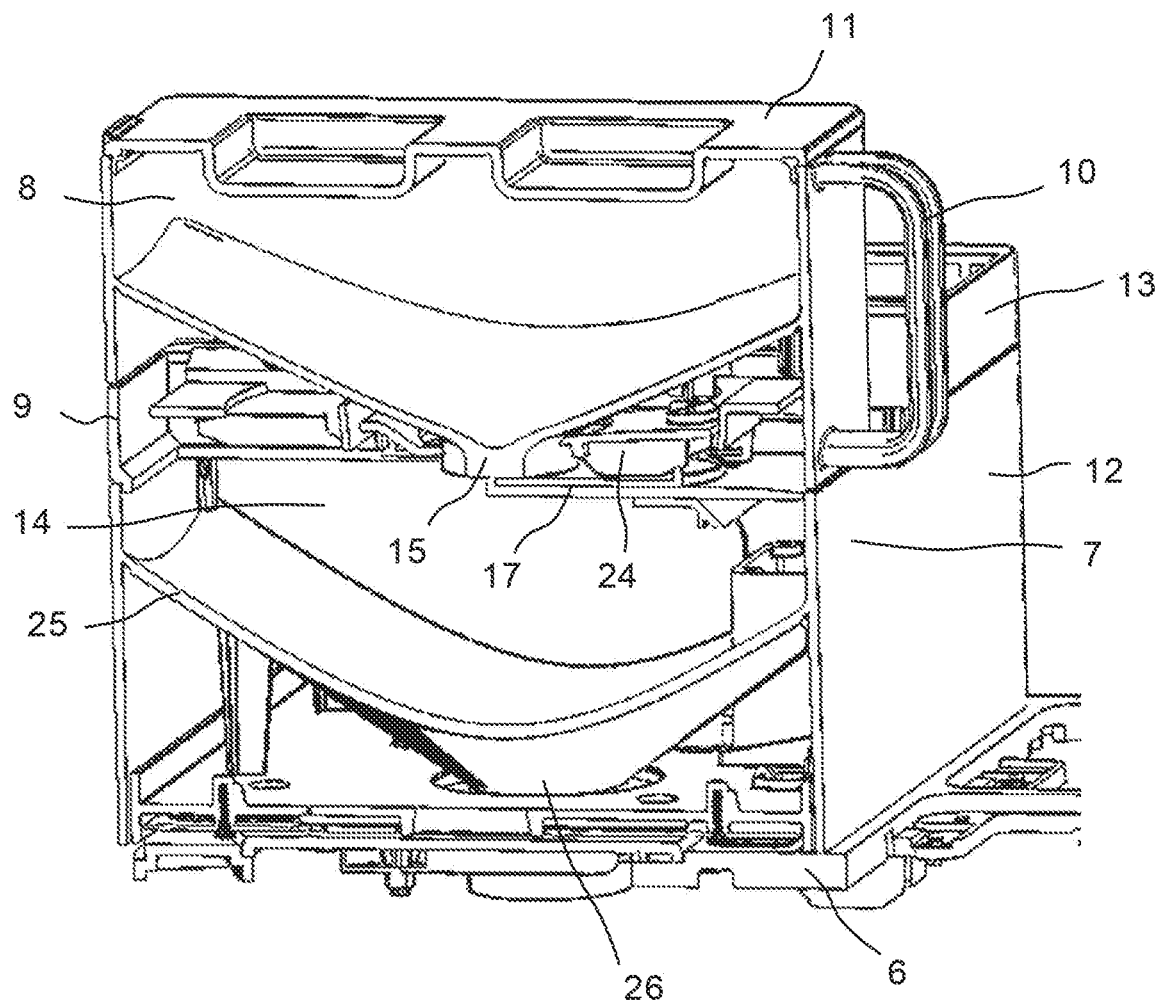
FIG. 6 shows an isometric illustration of a two-part supply container cut open in the longitudinal direction.
Figure 7:
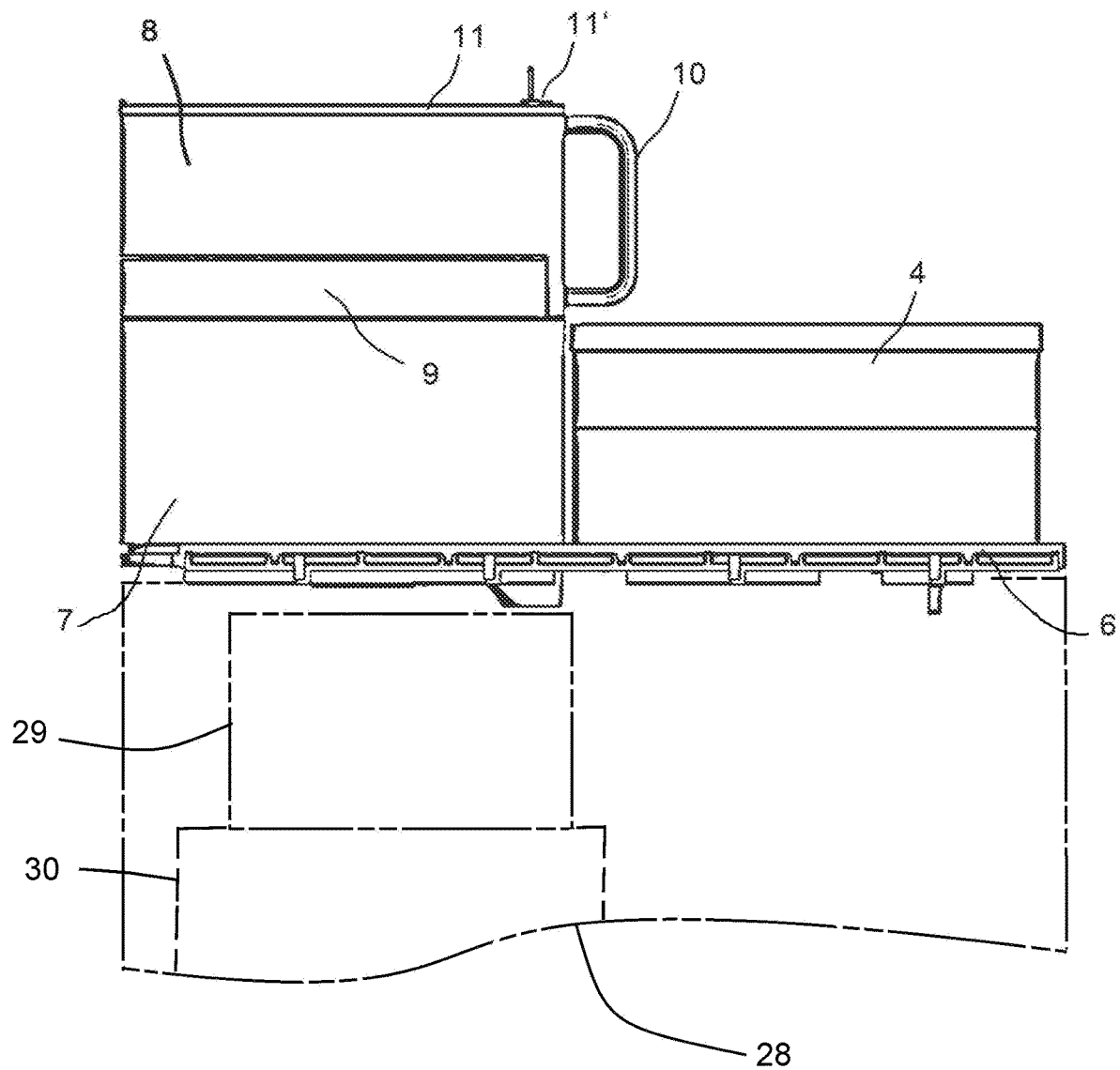
FIG. 7 shows a view similar to FIG. 2 with the supply container arrangement located over a schematically illustrated fully automatic coffee machine.

In the isometric illustration of FIG. 5, it is clear that the locking part 21 has in each case two latches 24 which are arranged laterally with respect to the connection opening and are intended for securing the slide 17. In the partially sectioned illustration in FIG. 6, the two-part supply container 2 is illustrated in the joined-together state. The slide 17 is in its right-hand, open position and frees the connection opening 15, with the result that coffee beans can trickle from the upper part-container 8 into the lower part-container 7 via the chute formed by the oblique bottom 16. The rear connecting wall 14 separates the lower part-container 7 of the left-hand supply container 2 from the lower part-container 12 of the right-hand supply container 3 situated alongside. A funnel-shaped oblique bottom 25 is also arranged in the lower part-container 7 and opens in an outlet opening 26 through which the coffee beans can fall into a grinding unit, indicated schematically at 29 in FIG. 7, of the fully automatic coffee machine, also indicated schematically at 28 in FIG. 7, that is situated below, and from there into a brewing system 30.

To fill the supply containers 2, 3, the associated upper part-container 8 can thus be extracted from its rail guide 9, 13, filled and inserted again without the operation of the associated fully automatic coffee machine being adversely affected or interrupted. The rail guides 9, 13 can each be mounted such that the associated upper part-container 8 can be extracted either forwards, that is to say for use in a fully automatic coffee machine in the service area, or rearwards, for example for use in a fully automatic coffee machine in the self-service area. Interruption-free and convenient filling of the fully automatic coffee machine with coffee beans is thus ensured.

The invention claimed is:

1. A beverage preparation device, comprising:
    a cover plate (6) having at least one feed opening for one or more solid starting product for the preparation of hot or cold beverages;
    a grinding unit situated below the cover plate;
    a brewing system that receives product from the grinding unit;
    a supply container arrangement for storing and feeding the one or more solid starting products for the preparation of hot or cold beverages, the supply container arrangement including:
        at least one two-part supply container (2) having a lower part-container (7) that has a first compartment for storing the solid starting products and an outlet opening aligned with one of the at least one feed openings in the cover plate of the beverage preparation device, and a removable upper part-container (8) that has a second compartment for storing the solid starting products, the upper part-container (8) is arrangeable on the lower part-container (7), the upper part-container (8) includes a bottom (16) with a connection opening (15), and
        a closure device (17) is arranged on the connection opening (15) and includes a closing part that closes the connection opening (15) that is configured, upon joining together the upper part-container (8) to the lower part-container (7), to open automatically via contact with part of the upper part-container and opens the connection opening (15) such that there is an open connection between the upper part-container (8) and the lower part-container (7).

2. The beverage preparation device according to claim 1, further comprising a rail guide (9) mounted above the lower part-container (7), and the upper part-container (8) is inserted into said rail guide to join together said upper and lower part-containers.

3. The beverage preparation device according to claim 2, wherein the rail guide (9) has an end stop for the upper part-container (8) and is mounted on the lower part-container (7) in two mounting positions in such a way that the upper part-container (8) is insertable into the rail guide (9) either from a first direction or from a second direction opposite to the first direction.

4. The beverage preparation device according to claim 1, wherein the closing part comprises a slide (17) which, when joining together the upper part-container (8) and the lower part-container (7), is pushed into an opened position by a projection (19) arranged on the lower part-container (7) such that solid starting products from the second compartment are adapted to fall into the first compartment.

5. The beverage preparation device according to claim 4, wherein the slide (17) is secured in a closed state by a spring-loaded bar (21) and the bar has an oblique ramp (25) against which the slide (17) is displaced while overcoming a spring force.

6. The beverage preparation device according to claim 4, wherein when removing the upper p art-container (8) from the lower part-container (7), the slide (17) is guided into a closed position by a latching nose (20) arranged on the lower part-container (7).

7. The beverage preparation device according to claim 1, wherein the bottom (16) of the upper part-container (8) comprises an oblique bottom inclined towards the connection opening.

8. The beverage preparation device according to claim 7, wherein the bottom (16) of the upper part-container (8) tapers downward in a funnel shape towards the connection opening (15).

9. The beverage preparation device comprising a supply container arrangement according to claim 1.

10. The beverage preparation device according to claim 1, the bottom of the upper part-container is oblique and inclined toward the opening (15) and the lower part-container includes an oblique bottom that is inclined towards the outlet opening thereof, and from the bottom opening of the lower part-container, the solid starting products fall directly from the bottom opening of the lower part-container into the grinding unit.

* * * * *